United States Patent [19]

Gilbert

[11] Patent Number: 4,625,976
[45] Date of Patent: Dec. 2, 1986

[54] SHAPING ELEMENT FOR MANHOLE OPENING AND GASKET

[76] Inventor: Noël Gilbert, 238, 14e Avenue, La Guadeloupe Beauce-Sud Québec, Canada, G0M 1G0

[21] Appl. No.: 835,874

[22] Filed: Mar. 3, 1986

[51] Int. Cl.$^4$ .............................................. F16J 15/06
[52] U.S. Cl. .................................. 277/12; 277/207 A; 52/20
[58] Field of Search ........ 277/12, 32, 207 A, DIG. 2; 404/25, 26; 52/20, 21

[56] References Cited

U.S. PATENT DOCUMENTS

| | | | |
|---|---|---|---|
| 3,493,236 | 2/1970 | Kleindienst | 277/207 A X |
| 3,787,061 | 1/1974 | Yoakum | 52/20 X |
| 4,128,107 | 12/1978 | Blumhardt | 277/207 A X |
| 4,159,829 | 7/1979 | Ditcher | 277/207 A X |
| 4,200,299 | 4/1980 | Carlesimo | 277/207 A X |
| 4,387,900 | 6/1983 | Ditcher et al. | 277/207 A X |

FOREIGN PATENT DOCUMENTS 996150   8/1976   Canada .......................... 277/207 A Primary Examiner—Robert S. Ward

[57] ABSTRACT

A shaping element designed to form a sewer pipe receiving opening during pouring of concrete to mould a manhole. The shaping element also holds a gasket seal in position until the concrete is set. The shaping element is made of two axially separable parts each having a flange to form part of the sewer pipe receiving opening. The inner end of one flange has an L-shaped extension defining a radially inwardly extending step and an axially extending end portion, the inner end of the other part extends short of the step and overlaps the axial extension whereby there is formed a gasket seal receiving peripheral channel of L-shaped cross-section. The two parts are completely closed at their outer ends and are assembled by means of non-circular telescopic tubes at their center to maintain the same in a predetermined relative orientation.

15 Claims, 4 Drawing Figures

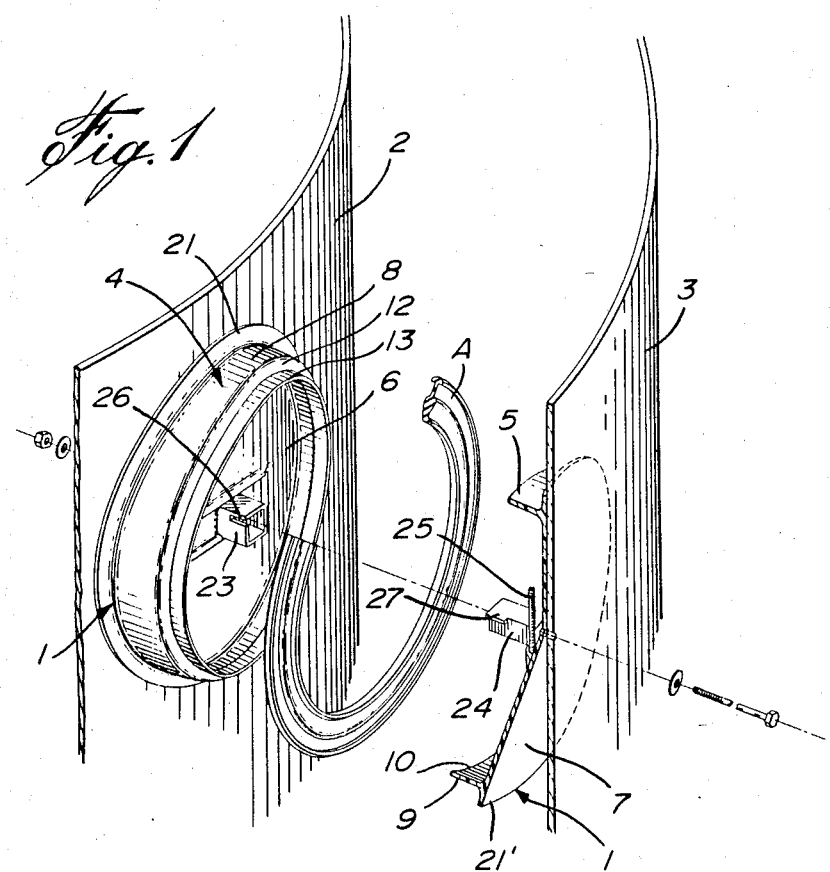
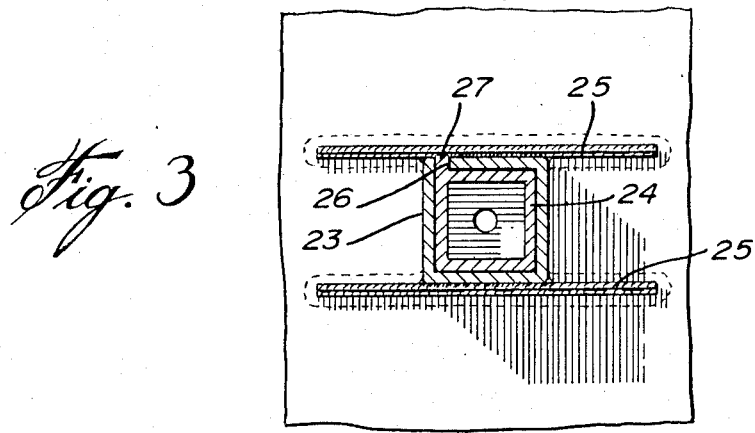

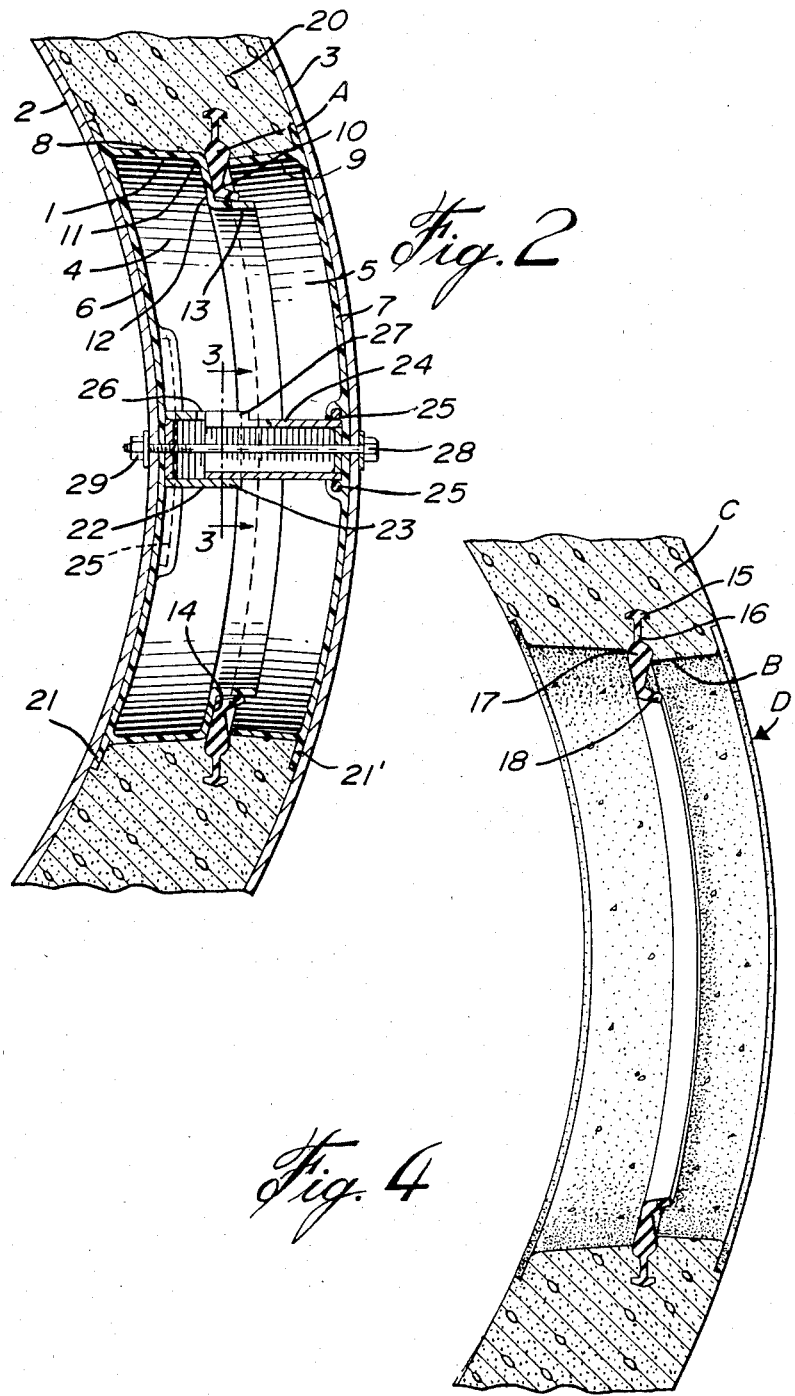

4,625,976

SHAPING ELEMENT FOR MANHOLE OPENING AND GASKET

FIELD OF THE INVENTION

This invention relates to a shaping element for the formation of a sewer pipe receiving opening during pouring of settable material to form a manhole and also to hold the sealing gasket in position within said sewer pipe receiving opening.

BACKGROUND OF THE INVENTION

In applicant's U.S. patent application Ser. No. 06/795,233 dated Nov. 5, 1985 and entitled GASKET SEAL BETWEEN SEWER PIPE AND MANHOLE OPENING, allowed Jan. 21st, 1986, there is described a new sealing gasket to effect a very good seal between a sewer pipe and a manhole opening.

OBJECTS OF THE INVENTION

The main object of the present invention is the provision of a shaping element specifically designed to install the above-noted sealing gasket in the manhole opening and to form said opening during pouring of settable material to form the manhole.

Another object of the invention is to provide a shaping element of the character described which is of simple and inexpensive construction which is made of two parts made in such a way as to prevent ingress into the shaping element of the settable material and which is provided with simple guiding and securing means which maintain the two parts of the shaping elements in their proper relative orientation.

SUMMARY OF THE INVENTION

The shaping element defines the inner surface of revolution of an opening through a wall of settable material as it is being formed between an exterior and an interior wall form. The shaping element comprises exterior and interior mating parts securing means to secure said mating parts in assembled position and which allows their axial separation, each part having an inwardly extending flange to mould a corresponding portion of the wall opening. The flange of the outer part is substantially straight in cross-section, the flange of the inner part has at its inner end an extension of L-shaped cross-section, one leg defining a radially inwardly extending step and the other free leg extending parallel to the long axis of the shaping element. The flange of the outer part extends short of the step whereby there is formed at the inner ends of the two flanges a peripheral channel to receive and retain the radially inward cross-sectionally angled sealing lip of the annular sealing gasket in accordance with the above-noted patent application. Preferably, outer walls completely close the outer ends of the sealing element to prevent ingress of settable material within the assembled shaping element. Preferably, these outer walls radially outwardly protrude from the respective flanges. These outer walls conform in shape and abut against the respective wall forms.

Preferably, guiding means in the form of axial telescopic non-circular tubular elements fixed to the center of the respective outer walls are provided for the ease in the axial assembly of the two parts and their axial separation. Slot and tab means are also preferably provided so as to permit assembly of the two parts for one relative orientation of the two parts. The securing means are simply a tie bolt extending through the tubular telescopic elements and through the wall forms.

BRIEF DESCRIPTION OF THE DRAWINGS

FIG. 1 is an exploded perspective view of the various components of the shaping element of the seal gasket to be installed on the same and of the two wall forms between which the shaping elements are installed;

FIG. 2 is a partial cross-section of a manhole with the shaping element and sealing gasket in position;

FIG. 3 is a cross-section taken along line 3—3 of FIG. 2; and

FIG. 4 is a cross-section of the manhole wall with the gasket installed therein, the shaping element having been removed.

DETAILED DESCRIPTION OF THE PREFERRED EMBODIMENT

The shaping or moulding element is generally indicated at 1 and is designed to be inserted in position between an inner wall form 2 and an outer wall form 3 to mould the inner surface B of a side opening made in manhole C for receiving a sewer pipe (not shown). The shaping element is also designed to hold in position the gasket seal A during pouring of the concrete to form the manhole wall C between the wall forms 2 and 3. Since a manhole is normally cylindrical, the two wall forms 2 and 3 are cylindrical and co-axial. The shaping element 1 is made of an inner shaping part 4 and an outer shaping parts 5 which are assembled by axial movement towards each other and disassembled by axial separation after the concrete or other settable material has set and after the wall forms 2 and 3 have been stripped away.

Inner shaping part 4 has an outer wall 6 while outer shaping part has an outer wall 7. Each outer wall 6 and 7 has a shape to conform with and abut the respective inner and outer wall forms 2 and 3. More specifically, each outer wall 6, 7 is curved in cross-section along a horizontal diameter to conform with the horizontal curvature of the wall forms 2 and 3 and are cross-sectionally straight in the vertical direction, i.e. along a diameter normal to the first-named diameter. The inner shaping part 4 has a flange 8 which is secured to the outer wall 6 near the periphery of the latter and extends inwardly. This flange 8 serves as a moulding surface to mould a portion of the inner surface B of the manhole side opening. Similarly, the outer shaping part 5 has a flange 9 which extends inwardly from the peripheral zone of outer wall 7 and serves to shape the remaining part of the manhole opening. Flange 9 is substantially straight in cross-section and has an inner end 10. Flange 8 is formed at its inner 11 with an extension of generally L-shaped cross-section defining as a first leg a radially inwardly extending step 12 and as a second leg a generally cylindrical portion 13 which, when the two shaping parts 4 and 5 are assembled or mated, laps the inner end portion 10 of flange 9 and is radially and inwardly spaced from the same. When the two shaping parts 4 and 5 are assembled, there is thus formed between step 12 and inner end 10 a peripheral channel 14 which opens radially outwardly and which is of L-shaped cross-section adapted to receive and retain between the two mating parts the gasket seal A in accordance with the above-noted patent application. As described in this application, the gasket seal A is made of elastomeric material as a continuous annulus and includes in unstressed state a radially outer cylindrical flange member 15 from the mid-plane of which extends a radial web 16 from the radially inner end of which, in turn, extends a pear-shaped enlargement 17 which tapers radially inwardly and which is extended by a cross-sectionally angled sealing lip 18. As shown in FIG. 2, the angled portion of the sealing lip 18 engages into the L-shaped channel and this lip is squeezed between the step 12 and the inner end 10 of the flange 9 so that the enlargement 17 and web 16 are maintained in a generally radially outwardly directed position so that part of the enlargement 17 and the whole of the web 16 and flange 15 will be embedded into the settable material 20.

Preferably, the outer walls 6 and 7 protrude radially outwardly from the respective flanges 8 and 9 so as to provide a still better seal between the wall forms 2 and 3 and the shaping element 11. These annular flanges 21, 21' together with the outer walls 6 and 7, completely prevent ingress of the settable material 20 within the assembled shaping element 1 during pouring of the settable material. The outer walls 6 and 7 serve also as a support for the means for guiding and securing the two shaping parts 4 and 5 together. These means include the following elements: to the center of the outer wall 6 of inner shaping part 4 is rigidly secured a tubular section 22 of non-circular cross-section preferably of square cross-section and which extends axially of the shaping element being completely opened at its inner end 23. Similarly, a tubular section 24 is secured to the center of the outer wall 7 of outer shaping element 5 and extends axially of the shaping element to telescopically engage within the tubular section 22. The shaping parts 4 and 5 may be made in one piece of glass-fibres reinforced synthetic resin and the tubular sections 22, 24 are made of steel and attached to the outer walls 6 and 7 by means of short metal rods 25 welded to the tubular sections 22, 24 and embedded within the synthetic resin of the outer walls. Obviously shaping parts 4 and 5 could be made of any other suitable material.

The tubular section 22 which is the outer element of the two telescopic elements is provided with a longitudinally extending slot 26 at one corner thereof and which opens at the inner end 23. The other tubular section 24 carries at its inner end an outwardly projecting tab 27 which engages the slot 26 upon assembly of the two shaping parts 4 and 5 only when these two shaping parts are properly oriented one with respect to the other; otherwise, the tab 27 cannot engage the slot 26 and the two shaping parts cannot be properly assembled. Once assembled with the-gasket seal A properly retained on the shaping element 10, the assembly of the shaping element of the gasket A are properly located between the wall forms 2 and 3 and are secured in position and tightened one against the other by a tie-bolt 28 with a nut 29, the tie bolt extending through holes made in the wall forms 2 and 3 and through the tubular sections 22, 24. When the material 20 has sufficiently set, the wall forms 2 and 3 can be stripped away after removal of the tie bolt 28 and the two shaping parts 4 and 5 can be disassembled by axial separation outwardly and inwardly of the manhole and the gasket seal remains in anchored position within the concrete surrounding the sewer pipe receiving opening. Inner end 10 is radially inwardly offset from inner end 11 to form a sewer pipe abutment in concrete C when the sewer pipe is excessively loaded. Yet lip 18 can flex in the direction of arrow D during and after pipe insertion. The pipe abutment prevents damage to the gasket seal A.

What we claim is:

1. A shaping element to define the inner, surface of revolution of an opening through a wall of settable material as it is being formed between an exterior and an interior wall form, said shaping element comprising: exterior and interior mating parts, securing means to secure said mating parts in assembled position providing a peripheral wall configured to produce an inner surface of revolution of a desired size and shape, each of said parts having a longitudinal axis which is co-axial with said opening when the parts are assembled and each part having a peripheral flange with an outer end and an inner end, said outer end adapted to abut the respective wall forms, each flange extending inwardly from its outer end and each defining a part of said peripheral wall, the inner end of the flange of said exterior part being radially inwardly offset relative to the inner end of the flange of said interior part, the inner ends of said flanges being axially spaced in the assembled position of said parts and providing a peripheral channel to receive and retain the radially inward lip portion of an annular sealing gasket which has a radially outward anchoring portion adapted to radially protrude from said peripheral wall to be anchored in said settable material.

2. A shaping element as defined in claim 1, wherein said inner and outer wall forms are cylindrical and co-axial, said shaping element further including an outer closure wall for each part secured to the outer end of the respective flanges and extending generally in a plane normal to said longitudinal axis, said closure walls having a curvature in one diametrical direction and being straight in a second diametrical direction normal to said one diametrical direction, the curvature of the respective closure walls adapted to conform with and abut said inner and outer wall forms respectively.

3. A shaping element as defined in claim 2, wherein said outer closure walls have a peripheral extension radially outwardly protruding from the associated flange.

4. A shaping element as defined in claim 2, wherein said securing means further includes guiding means for guiding axial movement of said two parts towards and away from each other while preventing their relative rotation, said guiding means maintaining said parts in a relative rotated position in which their respective one diametrical direction lie in one plane when said two parts are assembled.

5. A shaping element as defined in claim 4, wherein said guiding means includes non-circular telescopic tube elements fixed to the center of the closure wall of the respective parts, extending along said longitudinal axis within said shaping element and telescopically engaged when said two parts are assembled.

6. A shaping element as defined in claim 5, wherein said telescopic tube elements include an outer element provided with a longitudinal slot opening at its free end, and an inner element having an outwardly protruding tab engaging said slot when said inner element is telescoped within said outer element.

7. A shaping element as defined in claim 6, wherein said securing means includes tie bolt means extending through said telescoped tube elements.

8. A shaping element to define the inner surface of revolution of an opening through a wall of settable material as it is being formed between an exterior and an interior wall form, said shaping element comprising: exterior and interior mating parts, securing means to secure said mating parts in assembled position providing a peripheral wall configured to produce an inner surface of revolution of a desired size and shape, each of said parts having a longitudinal axis which is co-axial with said opening when the parts are assembled and each part having a peripheral flange with an outer end and an inner end, said outer end adapted to abut the respective wall forms, each peripheral flange extending inwardly from its outer end and each defining a part of said peripheral wall, the flange of said exterior part being substantially straight in section, the flange of said interior part being extended at its inner end by an extension of generally L-shaped cross-section having one leg forming a radially inwardly extending step transverse to said longitudinal axis and having the other leg extending generally parallel to said longitudinal axis, said other leg radially inwardly spaced from and lapping the inner end of said outer part, the inner end of said outer part being axially spaced from said step in the assembled position of said parts, the inner end of the flange of the outer part and said extension providing a peripheral channel of generally L-shaped cross-section to receive and retain the radially inward cross-sectionally angled sealing lip of an annular sealing gasket which has a radially outer anchoring portion adapted to radially protrude from said peripheral wall to be anchored in said settable material.

9. A shaping element as defined in claim 8, wherein the external surface of each flange is of least diameter at said channel and increases in diameter towards the outer end of each mating part, the minimum diameter of the flange of the outer mating part being less than the diameter of the flange of the inner mating part in the zone of said step.

10. A shaping element as defined in claim 9, wherein said inner and outer wall forms are cylindrical and co-axial, said shaping element further including an outer closure wall for each part secured to the outer end of the respective flanges and extending generally in a plane normal to said longitudinal axis, said closure walls having a curvature in one diametrical direction and being straight in a second diametrical direction normal to said one diametrical direction, the curvature of the respective closure walls adapted to conform with and abut said inner and outer wall forms respectively.

11. A shaping element as defined in claim 10, wherein said outer closure walls have a peripheral extension radially outwardly protruding from the associated flange.

12. A shaping element as defined in claim 10, wherein said securing means further includes guiding means for guiding axial movement of said two parts towards and away from each other while preventing their relative rotation, said guiding means maintaining said parts in a relative rotated position in which their respective one diametrical direction lie in one plane when said two parts are assembled.

13. A shaping element as defined in claim 12, wherein said guiding means includes non-circular telescopic tube elements fixed to the center of the closure wall of the respective parts, extending along said longitudinal axis within said shaping element and telescopically engaged when said two parts are assembled.

14. A shaping element as defined in claim 13, wherein said telescopic tube elements include an outer element provided with a longitudinal slot opening at its free end, and an inner element having an outwardly protruding tab engaging said slot when said inner element is telescoped within said outer element.

15. A shaping element as defined in claim 14, wherein said securing means includes tie bolt means extending through said telescoped tube elements.

* * * * *